(No Model.) 5 Sheets—Sheet 1.

J. DUGDILL.
MACHINE FOR COMBING COTTON, SILK, OR OTHER FIBER.

No. 545,014. Patented Aug. 20, 1895.

Witnesses:
E. B. Bolton
M. B. Barker

Inventor:
John Dugdill
By Richards & Leo
his Attorneys.

(No Model.) 5 Sheets—Sheet 2.

J. DUGDILL.
MACHINE FOR COMBING COTTON, SILK, OR OTHER FIBER.

No. 545,014. Patented Aug. 20, 1895.

Witnesses
E. B. Bolton
M. B. Barker

Inventor:
John Dugdill
By Richards & Co.
his Attorneys.

(No Model.) 5 Sheets—Sheet 3.
J. DUGDILL.
MACHINE FOR COMBING COTTON, SILK, OR OTHER FIBER.
No. 545,014. Patented Aug. 20, 1895.
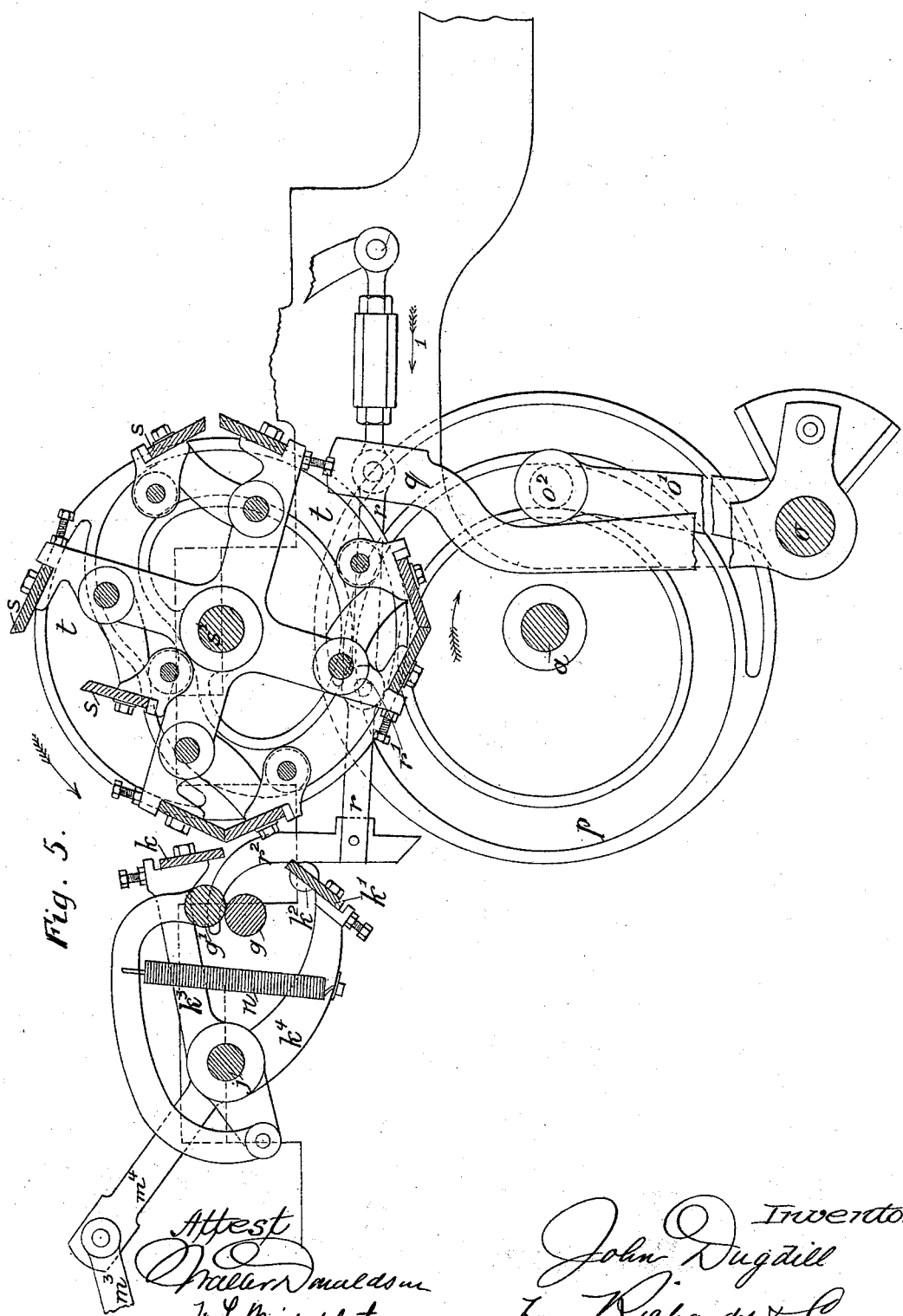

(No Model.) 5 Sheets—Sheet 4.

J. DUGDILL.
MACHINE FOR COMBING COTTON, SILK, OR OTHER FIBER.

No. 545,014. Patented Aug. 20, 1895.

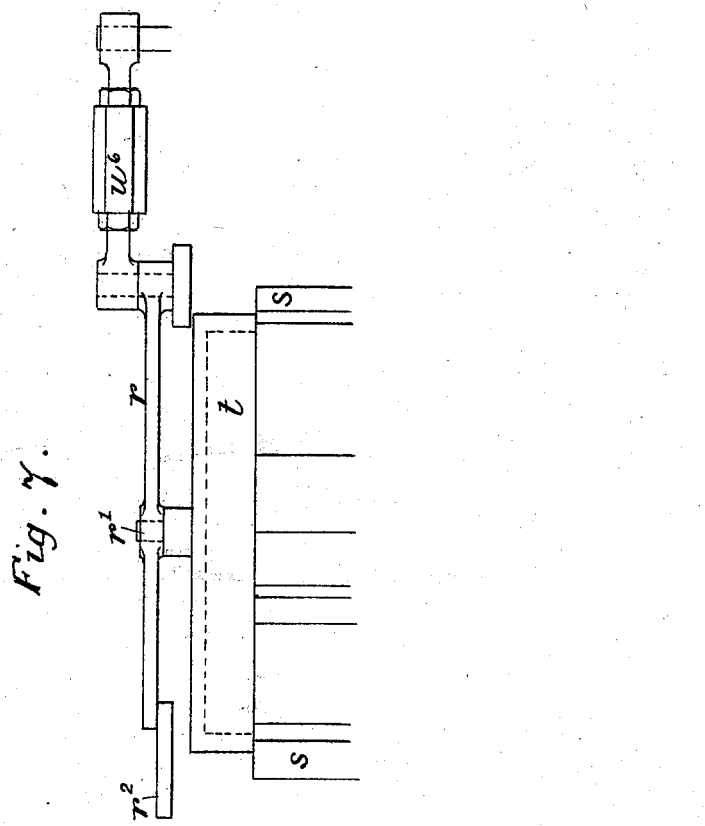

UNITED STATES PATENT OFFICE.

JOHN DUGDILL, OF MANCHESTER, ENGLAND, ASSIGNOR OF TWO-THIRDS TO PLATT BROTHERS & COMPANY, LIMITED, OF OLDHAM, AND JOHN KERSHAW & COMPANY, OF BRIGHOUSE, NEAR HALIFAX, ENGLAND.

MACHINE FOR COMBING COTTON, SILK, OR OTHER FIBER.

SPECIFICATION forming part of Letters Patent No. 545,014, dated August 20, 1895.

Application filed October 5, 1893. Serial No. 487,213. (No model.) Patented in England July 11, 1885, No. 8,378.

*To all whom it may concern:*

Be it known that I, JOHN DUGDILL, a subject of the Queen of Great Britain, residing at New Moston, Failsworth, Manchester, in the county of Lancaster, England, have invented certain new and useful Improvements in Machines for Combing Cotton, Silk, or other Fibers, (for which I have obtained Letters Patent in Great Britain, numbered 8,378, bearing date July 11, 1885,) of which the following is a specification.

My invention relates to improvements in those machines for combing cotton, silk, and other fibers in which a revolving nipper and combing cylinders are employed; and my improvements consist chiefly in certain novel arrangements and combinations of the parts of such machines as hereinafter described, and as pointed out in the claims.

In order that my invention may be fully understood and readily carried into effect, I will describe the accompanying drawings, reference being had to the letters marked thereon.

Figure 1:
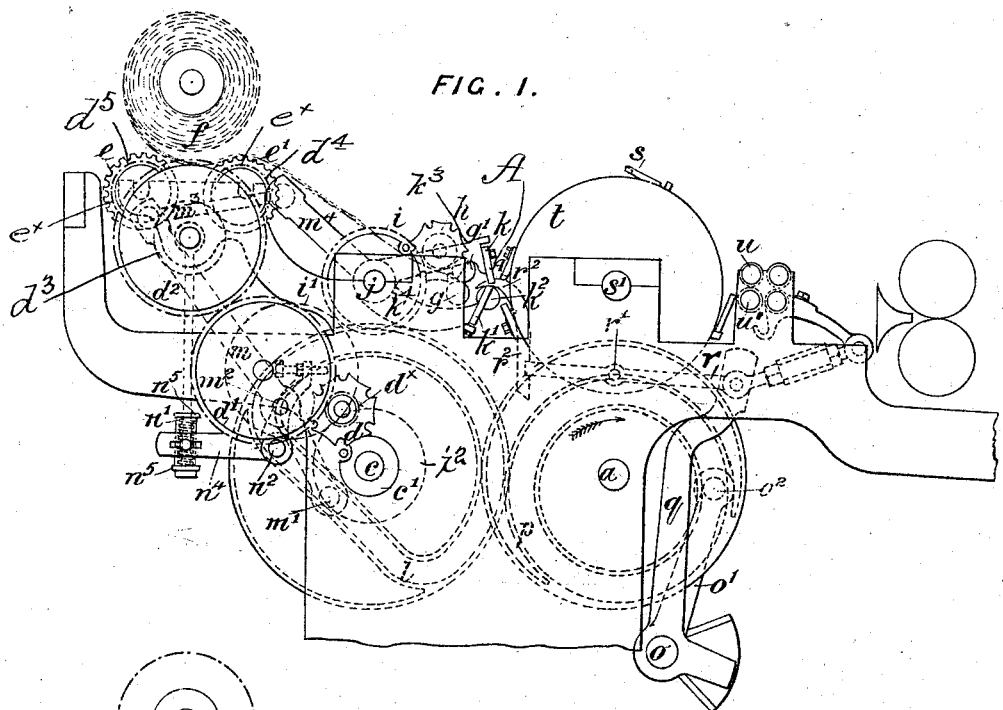
Figure 2:
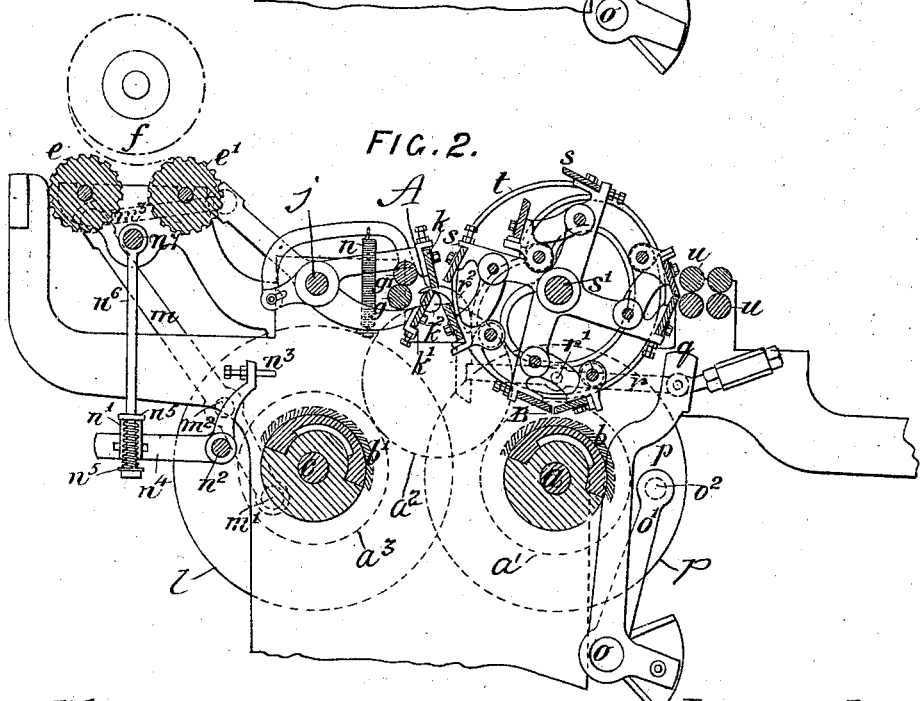
Figure 4:
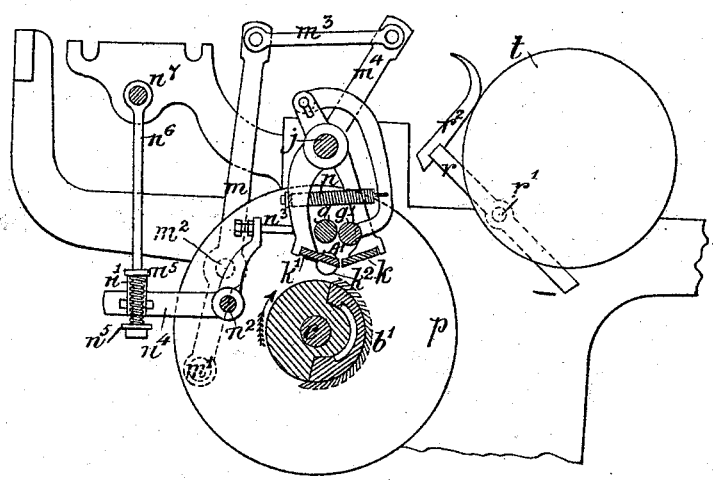
Figure 3:
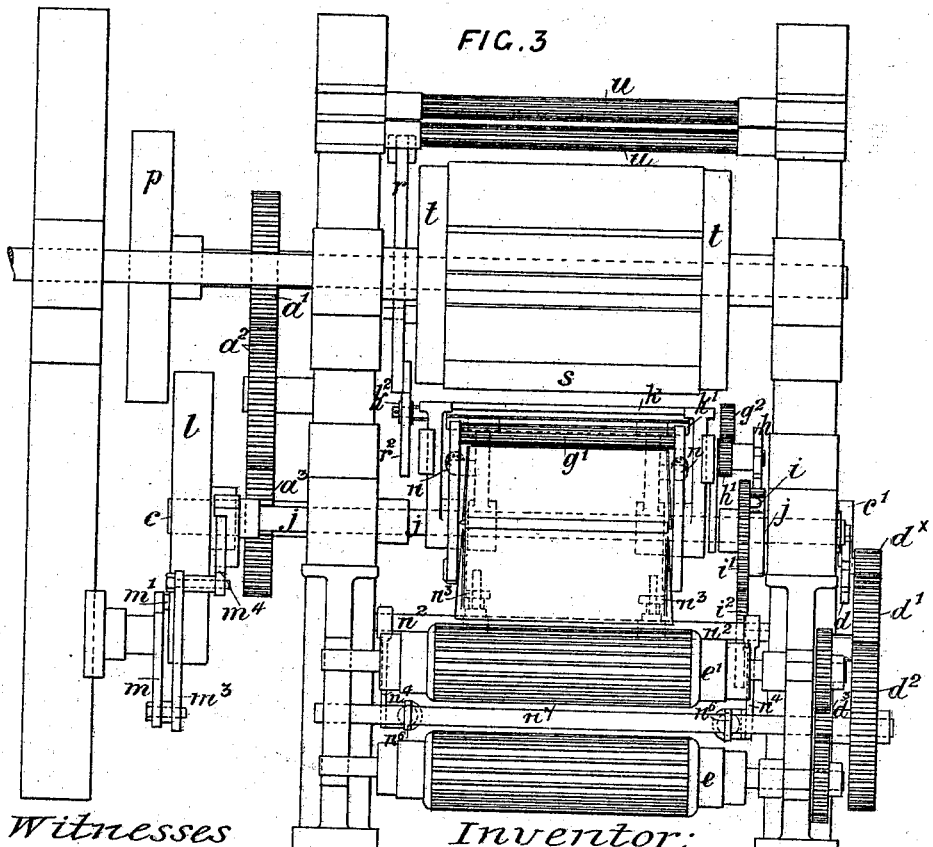
Figure 6:
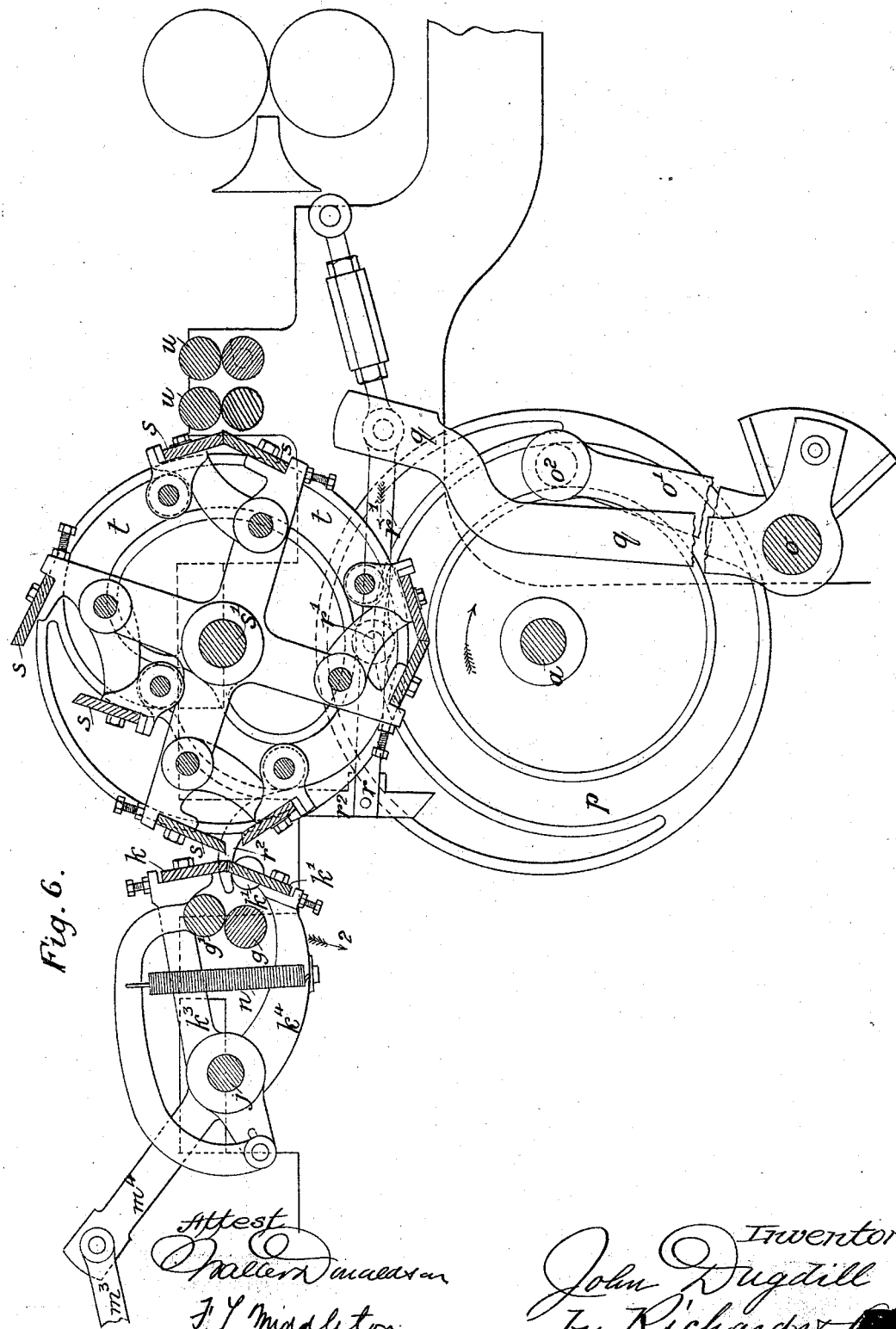

Figure 1 is a side view of the machine, showing the position of the reciprocating nippers when opposite the revolving nippers. Fig. 2 is a longitudinal section of the machine, showing the reciprocating nippers in position to present the tuft to the revolving nippers and showing other pairs of revolving nippers in position to present one tuft to the second combing-cylinder and another tuft to the delivery-rollers. Fig. 3 is a plan of the machine. Fig. 4 shows some of the parts in section which are shown in Fig. 2 and shows the reciprocating nippers in position to present the tuft to the first combing-cylinder. Fig. 5 is a longitudinal section of part of the machine with the reciprocating nippers open and showing the revolving nippers on the other side open, having just delivered the tuft to the delivery-rollers. Fig. 6 is a similar section to Fig. 5, but showing the parts in a different position. Fig. 7 is a plan of part of Fig. 6.

The greater part of the framing of the machine is omitted in these views for the sake of clearness.

On the shaft $a$, which is driven from the first motion shaft in any convenient manner, is mounted the second comb-cylinder $b$. The shaft $a$ drives the shaft $c$ by the train of wheels $a'$ $a^2$ $a^3$, (shown in Fig. 3,) so that the shaft $c$ and the first comb-cylinder $b'$ mounted upon it revolve respectively at the same speed as the shaft $a$ and the second comb-cylinder $b$. Also fixed on the shaft $c$ is a stud-wheel $c'$, (shown in Fig. 1,) which engages with and drives a star-wheel $d$, on the boss of which is formed or fixed a pinion $d^x$, which thus receives intermittently a revolving motion, which motion is transmitted by the train of wheels $d'$ $d^2$ $d^3$ $d^4$ $d^5$ to the lap-rollers $e$ $e'$ upon which the lap $f$ is laid.

The lap $f$ is uncoiled by friction when the rollers $e$ $e'$ receive their intermittent motion, as described, and is conducted by a guide-plate (not shown) to the front feed-rollers $g$ $g'$, of which the lower roller $g$ is driven by a pinion $h'$ on the boss of a star-wheel $h$, gearing into a pinion $g^2$ on the roller $g$, as shown in Fig. 3.

The star-wheel $h$ is actuated by the stud-wheel $i$, which is fitted loosely on the shaft $j$ and is driven from the shaft $c$ by the gears $i'$ $i^2$, and thus an intermittent rotary motion is imparted to the feed-rollers $g$ $g'$.

The feed-rollers $g$ $g'$, the star-wheel $h$, and the guide-plate for the lap are all supported by connections from the shaft $j$ on which the stud-wheel $i$ is mounted, and this shaft $j$ also supports the reciprocating nippers $k$ $k'$, which grip the lap as it is fed forward by the intermittent motion of the lap-rollers $e$ $e'$ and feed-rollers $g$ $g'$, so that when the shaft $j$ is turned by the means hereinafter described the guide-plate, (not shown,) the star-wheel $h$, the feed-rollers $g$ $g'$, and the nippers $k$ $k'$, with the end of the lap move from the position A they occupy in Figs. 1 and 2 to the position A', (see Fig. 4,) where the free end of the fiber held in the nippers $k$ $k'$ is combed by the action of the revolving cylinder $b'$.

When the fiber has been combed, the shaft $j$ is again moved and the fiber, still held in the nippers $k$ $k'$, returns with the feed-rollers $g$ $g'$ and other parts to the original position A. The shaft $j$ is actuated to impart the above-described reciprocating motion to the nippers $k$ $k'$ from the hollow cam $l$, which is fixed on the revolving shaft $c$ and actuates by means of a stud $m'$ the rocking lever $m$, which is pivoted on a short shaft $m^2$ and connected by a link $m^3$ to a lever $m^4$, fixed upon the shaft $j$, which thus oscillates backward or forward as the stud $m'$ is moved in the path of the hollow cam $l$.

The nipper $k$ is fixed upon the arm $k^3$, which is secured to the shaft $j$, but the arm $k^4$ of the nipper $k'$ is mounted loosely on the shaft $j$ and is kept normally closed against the nipper $k$ by the side springs $n$, (see Figs. 2, 4, 5, and 6,) and in addition to the reciprocating motion already described for the nippers the nipper $k'$ has an independent reciprocating motion to and from the nipper $k$ in order to seize and release the fiber as required, and this is effected by the following mechanism: On the shaft $o$ is fixed a lever $o'$, on a stud at the end of which is mounted a bowl $o^2$, which is moved along the path of a hollow cam $p$, fixed on the revolving shaft $a$, and thus a rocking motion is imparted to the lever $o'$ and shaft $o$ and to the lever $q$, which is also fixed on the said shaft. The lever $q$ is pivoted to a link $r$, pivoted at $r'$ to a hollow cam $t$, mounted loosely on the shaft $s'$, and this link $r$ carries or has upon it a hooked finger $r^2$, which moves forward with the link $r$ and the cam $t$ when the shaft $o$ and lever $q$ are rocked in the direction indicated by the arrow 1 on the link $r$, and thus forces down a bowl $k^2$, mounted on the nipper $k'$, thereby opening the nippers $k\ k'$, which then receive a fresh feed of lap fed forward by the rollers $g\ g'$. When the nippers $k\ k'$ move downward to the position they occupy in Fig. 4, the stud $k^2$ passes away from the finger $r^2$ and allows the springs $n$ to close the nippers $k\ k'$ on the fiber. Extra pressure is put on the nippers $k\ k'$ while the fiber is being combed by the cylinder $b'$ by means of the springs $n'$, which act upon a shaft $n^2$ by means of arms $n^4$ and cause the stop-pieces $n^3$, secured to said shaft, to bear on the back of the nipper $k'$, and thus assist in keeping it closed, as shown in Fig. 4. The springs $n'$ are compressed between adjustable plates $n^5$ on rods $n^6$, pivoted to the frame at $n^7$. From the nippers the fibers are delivered to the delivery-rolls $u$. The mechanism is so arranged and timed that the reciprocating nippers $k\ k'$ are opened as soon as they return to the position A with the tuft of fibers which has been combed at one end by the cylinder $b'$, and simultaneously as the reciprocating nippers $k\ k'$ are opened the partially-combed tuft of fibers is seized by a pair of revolving nippers $s$, four pairs of which are keyed on the shaft $s'$, which is driven one-fourth round at a time by spaced gearing (not shown) in the well-known manner, so as to impart an intermittent revolving motion to the nippers $s$, which are opened and closed by the reciprocating or oscillating motion of the cam $t$, which moves forward and backward with the link $r$ and hooked finger $r^2$, as already described. The partially-combed tuft of fibers is thus seized by the revolving nippers $s$ at the moment when the reciprocating nippers $k\ k'$ are opened and as the shaft $s'$ is being turned through a quarter of a revolution, and the effect of this is that as the revolving nippers $s$ move the tuft of fibers is torn off from the lap held between the feed-rollers $g\ g'$, and this tuft is carried by the nippers $s$ to the position B, as shown in Fig. 2, where the other end is combed by the cylinder $b$ and the tuft is afterward carried forward by the nippers $s$. From the nippers the fibers are delivered to the delivery-rolls $u$. When the reciprocating nippers $k\ k'$ are opened, the lap-rollers $e\ e'$ and the feed-rollers $g\ g'$ are rotated, as already described, and fresh fiber is fed forward to the reciprocating nippers $k\ k'$.

Having now particularly described and ascertained the nature of my said invention and in what manner the same is to be performed, I declare that what I claim, and desire to secure by Letters Patent of the United States, is—

1. In combination in a combing machine, the combing cylinder $b'$, the rock shaft $j$ the nippers one of which is fixed thereto, the means for rocking the shaft with the fixed upper nipper the second nipper loosely pivoted on the said shaft and held normally closed against the fixed nipper and operating connections leading to the loose nipper for turning the same on the shaft $j$ away from the fixed nipper, substantially as described.

2. In combination, the combing cylinder $b'$, the nippers $k, k'$, with means for operating them and the yielding means for forcing the nippers in strong contact when adjacent to the combing cylinder, substantially as described.

3. In combination, the combing cylinder $b'$, the nippers movable toward and from the same and toward and from each other and the means for pressing the nippers together while adjacent to the combing cylinder consisting of the bearing $n^3$, the lever carrying the same and the spring pressing the lever substantially as described.

4. In combination, the combing cylinder $b'$, the separable nippers $k, k'$, movable toward and from the same and the series of rotary nippers, the shaft $s'$ carrying the same, the oscillating cam for opening and closing said nippers and the opening finger for the nippers $k, k'$, carried by the said oscillating cam, substantially as described.

5. In combination, the combing cylinder $b'$, the separable nippers $k, k'$, the means for operating them toward and from the combing cylinder and the reciprocating opening finger $r^2$ with means for operating it to separate the nippers, substantially as described.

6. In combination, the combing cylinder $b'$, the separable nippers with means for reciprocating them, the rotary nippers, the shaft therefor with means for operating said shaft and the oscillating cam $t$ for opening and closing the rotary nippers with means for operating said cam, substantially as described.

7. In combination, the combing cylinder $b'$, the separable nippers with means for reciprocating them, the rotary nippers with means for rotating them, the oscillating cam for opening and closing the rotary nippers and the separating finger $r^2$ oscillating with the cam, substantially as described.

In witness whereof I have hereunto set my hand in presence of two witnesses.

JOHN DUGDILL.

Witnesses:
S. W. GILLETT,
H. B. BARLOW.